US008281271B1

(12) United States Patent
Oh et al.

(10) Patent No.: US 8,281,271 B1
(45) Date of Patent: Oct. 2, 2012

(54) METHOD AND APPARATUS FOR PERFORMING LUTMASK BASED DELAY MODELING

(75) Inventors: Jungmoo Oh, Toronto (CA); Lyndon Francis Carvalho, Thornhill (CA); Chris Wysocki, Toronto (CA)

(73) Assignee: Altera Corporation, San Jose, CA (US)

(*) Notice: Subject to any disclaimer, the term of this patent is extended or adjusted under 35 U.S.C. 154(b) by 238 days.

(21) Appl. No.: 12/287,828

(22) Filed: Oct. 14, 2008

Related U.S. Application Data

(60) Provisional application No. 61/190,361, filed on Aug. 28, 2008.

(51) Int. Cl.
*G06F 9/455* (2006.01)
*G06F 17/50* (2006.01)

(52) U.S. Cl. ......... 716/113; 716/108; 716/133; 716/134

(58) Field of Classification Search ............... 716/6, 113
See application file for complete search history.

(56) References Cited

U.S. PATENT DOCUMENTS

| 6,023,568 | A | * | 2/2000 | Segal .................................. 716/6 |
| 7,424,697 | B1 | * | 9/2008 | Arslan et al. .................... 716/16 |
| 7,467,314 | B2 | * | 12/2008 | Mendel et al. ................. 713/320 |
| 7,689,955 | B1 | * | 3/2010 | van Antwerpen et al. ........ 716/6 |
| 2004/0068705 | A1 | * | 4/2004 | Sivaraman et al. ............... 716/6 |

* cited by examiner

*Primary Examiner* — Jack Chiang
*Assistant Examiner* — Eric Lee
(74) *Attorney, Agent, or Firm* — L. Cho (57) ABSTRACT

A method for determining a delay through a lookup table (LUT) in a logic array block (LAB) of a field programmable gate array (FPGA) for a signal includes identifying paths through the LUT that are taken for the signal. Delays are computed for the signal only on the paths identified.

21 Claims, 9 Drawing Sheets

| D | C | B | A | f | CRAM Bit # |
|---|---|---|---|---|---|
| 0 | 0 | 0 | 0 | 1 | 0 |
| 0 | 0 | 0 | 1 | 0 | 1 |
| 0 | 0 | 1 | 0 | 0 | 2 |
| 0 | 0 | 1 | 1 | 1 | 3 |
| 0 | 1 | 0 | 0 | 1 | 4 |
| 0 | 1 | 0 | 1 | 1 | 5 |
| 0 | 1 | 1 | 0 | 0 | 6 |
| 0 | 1 | 1 | 1 | 1 | 7 |
| 1 | 0 | 0 | 0 | 1 | 8 |
| 1 | 0 | 0 | 1 | 0 | 9 |
| 1 | 0 | 1 | 0 | 0 | 10 |
| 1 | 0 | 1 | 1 | 1 | 11 |
| 1 | 1 | 0 | 0 | 1 | 12 |
| 1 | 1 | 0 | 1 | 1 | 13 |
| 1 | 1 | 1 | 0 | 0 | 14 |
| 1 | 1 | 1 | 1 | 1 | 15 |

METHOD AND APPARATUS FOR PERFORMING LUTMASK BASED DELAY MODELING

RELATED APPLICATION

This application claims priority to provisional U.S. Patent Application Ser. No. 61/190,361 filed Aug. 28, 2008, titled "Method and Apparatus for Performing LUTMASK Based Delay Modeling", the full and complete subject matter of which is hereby expressly incorporated by reference in its entirety.

TECHNICAL FIELD

An embodiment of the present invention relates to electronic design automation tools for designing systems on target devices. More specifically, embodiments of the present invention relate to a method and apparatus for performing lookup table MASK (LUTMASK) based delay modeling.

BACKGROUND

Logic devices such as field programmable gate arrays (FPGAs) are used to implement large systems that may include million of gates and megabits of embedded memory. The complexity of large systems often requires the use of electronic design automation (EDA) tools to create and optimize a design for the system onto physical target devices. Among the procedures performed by EDA tools in a computer aided design (CAD) flow are synthesis, placement, and routing.

Timing analysis is an important aspect of design that allows the EDA tools to determine whether certain synthesis, placement, and/or routing decisions allow a design to satisfy system timing requirements. If a particular synthesis, placement, and/or routing decision does not satisfy system timing requirements, alternate strategies may be explored and/or notification may be provided to the system designer. Timing analysis may be performed during or after synthesis, placement, and routing.

One component in timing analysis is the computation of LUT delay. LUT delay is a numerical delay through a LUT, an elementary programmable logic block on an FPGA. A LUT may have multiple binary inputs and a single output. A LUT is programmable to represent any Boolean function through its LUTMASK, which is a vector of binary values. A LUT delay is specified by input and output port names, input and output signal transition, and CRAM bits selected.

One approach used by timing analyzers in the past was to use a predetermined delay value that represented the worst delay for all paths through a LUT for a data input. This approach reduced the amount of work required of the timing analyzer, but produced a result that was pessimistic and less accurate. Another approach used by timing analyzers was LUTMASK based delay modeling which computed more accurate actual delays by taking into account actual CRAM bit paths. When performing, LUTMASK based delay modeling using the Liberty Model, timing analyzers treated LUTs as black boxes and computed delays for all possible LUTMASK configurations. This required $2^{16}$ delay computations for a single LUT delay. Given that each 4 input LUT has 32 delays (4 inputs*4 transitions*2 min/max values), timing analyzers were required to compute and store at least $32 * 2^{16}$ LUT delay values. This approach required additional run time and memory resources.

SUMMARY

According to an embodiment of the present invention, a procedure to perform LUTMASK based modeling transforms the $O(2^n)$ exponential size Liberty Modeling to a $O(n)$ delay computation problem, where n is the number of CRAM bits supported by a LUT. The procedure only computes delays of LUT configurations that are used in a design, rather than computing delays of all possible LUTs in Liberty Modeling. Paths with impossible output transition under a given LUTMASK are also eliminated. Paths with constant output on a given input transition are eliminated. Constant inputs are analyzed to eliminate unselectable CRAM bit paths. Fitting optimization may also be performed by setting redundant inputs to select faster CRAM bits. The procedure may also store LUTs with unique delays to reduce run time and memory usage.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
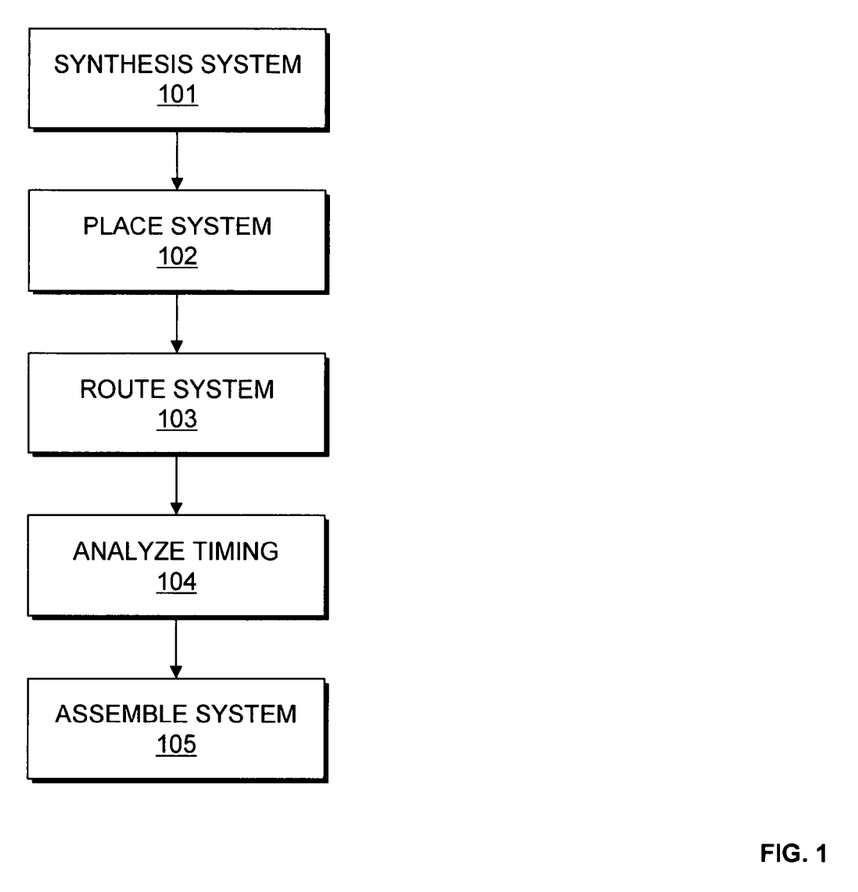
FIG. 1 is a flow chart illustrating a method for designing a system on a target device according to an embodiment of the present invention.

FIG. 1 is a flow chart illustrating a method for designing a system according to an embodiment of the present invention. The method may be performed by a system designer such as an EDA tool. The target device may be an ASIC, structured ASIC, FPGA, programmable logic device (PLD), printed circuit board (PCB), or other target device. At 101, synthesis is performed on a design of a system. According to an embodiment of the present invention, synthesis generates an optimized logical representation of the system from a HDL design definition. The optimized logical representation of the system may include a representation that has a minimized number of functional blocks such as logic gates, logic elements, and registers required for the system. Technology mapping is also performed on the optimized logic design.

Technology mapping includes determining how to implement logic gates and logic elements in the optimized logic representation with resources available on the target device. The resources available on the target device may be referred to as "cells" or "components" and may include logic-array blocks, registers, memories, digital signal processing blocks, input output elements, and other components. According to an embodiment of the present invention, an optimized technology-mapped netlist (cell netlist) is generated from the HDL.

Figure 2:
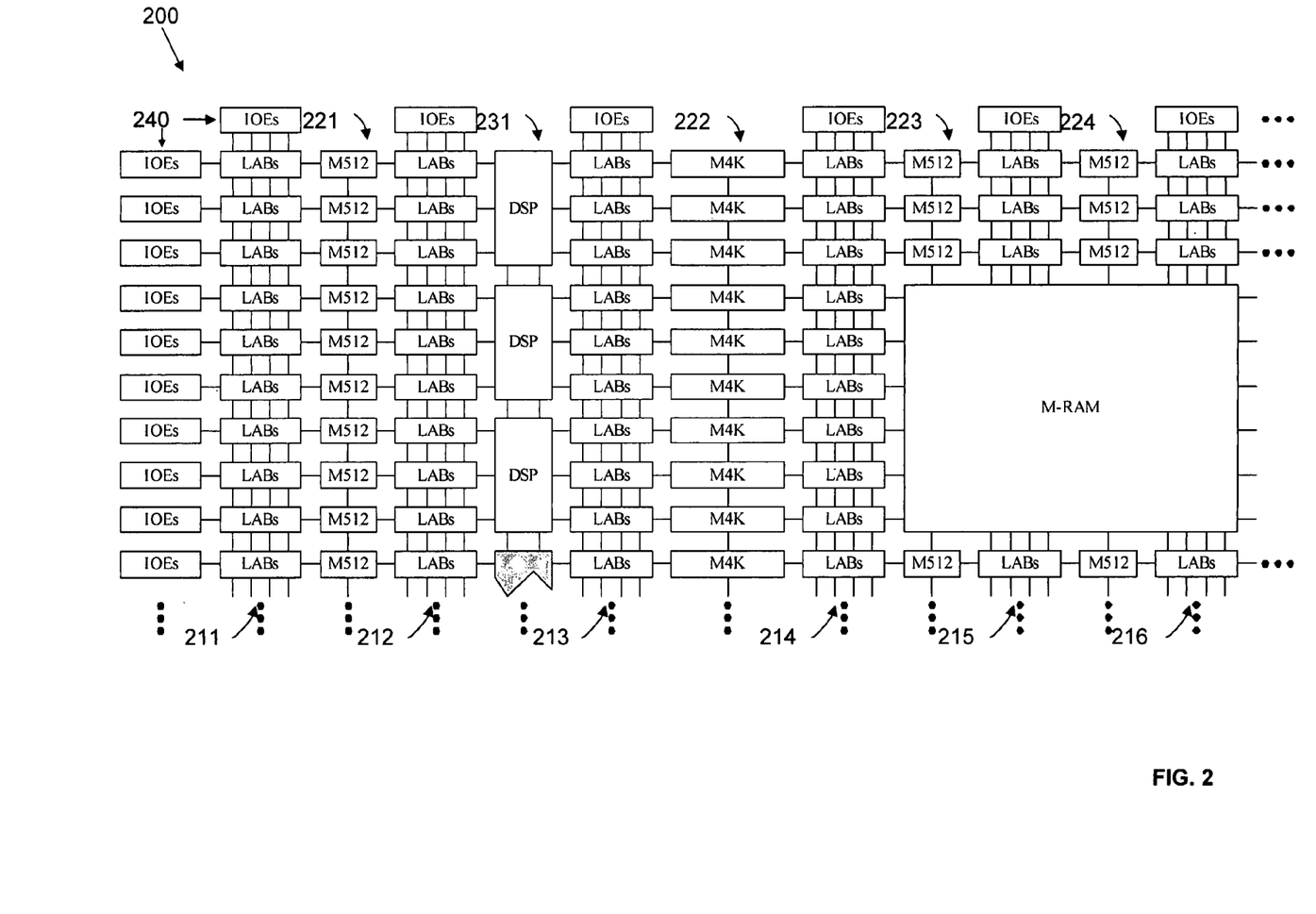
FIG. 2 illustrates a field programmable gate array (FPGA) according to an embodiment of the present invention.

FIG. 2 illustrates an exemplary target device 200 in which a system may be implemented on utilizing an FPGA according to an embodiment of the present invention. According to one embodiment, the target device 200 is a chip having a hierarchical structure that may take advantage of wiring locality properties of circuits formed therein.

The target device 200 includes a plurality of logic-array blocks (LABs). Each LAB may be formed from a plurality of logic blocks, carry chains, shared arithmetic chains, LAB control signals, and register chain connection lines. A logic block is a small unit of logic providing efficient implementation of user logic functions. A logic block includes one or more LUT-based resources, programmable registers, and a single output. Depending on its architecture, a logic block may also include dedicated adders, a carry chain, an arithmetic chain, and a register train. LABs are grouped into rows and columns across the target device 200. Columns of LABs are shown as 211-216. It should be appreciated that the logic block may include additional or alternate components.

The target device 200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 200. Columns of memory blocks are shown as 221-224.

The target device 200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 200 and are shown as 231.

The target device 200 includes a plurality of input/output elements (IOEs) 240. Each IOE feeds an I/O pin (not shown) on the target device 200. The IOEs are located at the end of LAB rows and columns around the periphery of the target device 200.

The target device 200 includes LAB local interconnect lines (not shown) that transfer signals between LEs in the same LAB, a plurality of row interconnect lines ("H-type wires") (not shown) that span fixed distances, and a plurality of column interconnect lines ("V-type wires") (not shown) that operate similarly to route signals between components in the target device.

FIG. 2 illustrates an exemplary embodiment of a target device. It should be appreciated that a system may include a plurality of target devices, such as that illustrated in FIG. 2, cascaded together. It should also be appreciated that the target device may include programmable logic devices arranged in a manner different than that on the target device 200. A target device may also include FPGA resources other than those described in reference to the target device 200. Thus, while the invention described herein may be utilized on the architecture described in FIG. 4, it should be appreciated that it may also be utilized on different architectures, such as those employed by Altera Corporation or Xilinx Inc.

Referring back to FIG. 1, the synthesis procedure may utilize the delay difference between CRAM bits to perform fitting optimization on LUTs. According to an embodiment of the present invention, when logic mapped onto a LUT does not require use of all inputs to the LUT, the delay difference between CRAM bits may be used to optimize the design. The unused inputs of the LUT could be configured with constant 1 or 0 states such that the implemented logic in the LUT experiences faster performance through the use of CRAM bits that have the fastest connections to the output of the LUT. Alternatively, the selection of unused inputs of the LUT can be used to put the LUT in a lower power consumption configuration and used in the optimization of static and dynamic power.

At 102, the mapped logical system design is placed. Placement works on the optimized technology-mapped netlist to produce a placement for each of the functional blocks. According to an embodiment of the present invention, placement includes fitting the system on the target device by determining which resources available on the target device are to be used for specific function blocks in the optimized technology-mapped netlist. According to an embodiment of the present invention, placement may include clustering which involves grouping logic elements together to form the logic clusters present on the target device.

At 103, it is determined which routing resources should be used to connect the components in the target device implementing the functional blocks of the system. During routing, routing resources on the target device are allocated to provide interconnections between logic gates, logic elements, and other components on the target device. The routing procedure may be performed by a router in an EDA tool that utilizes routing algorithms.

At 104, timing analysis is performed to determine one or more delay values for one or more paths in the system. A path may include a path for a signal through routing resources and/or through components. The one or more delay values may be output to a designer or user of the system. Alternatively, the timing analysis procedure 104 may be performed during or after synthesis procedure 101, placement procedure 102, and/or routing procedure 103 and the one or more delay values may be used to improve or optimize synthesis, placement, and/or routing decisions.

At 105, an assembly procedure is performed. The assembly procedure involves creating a data file that includes some of the information determined by the procedure described by 101-103. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

Figure 3:
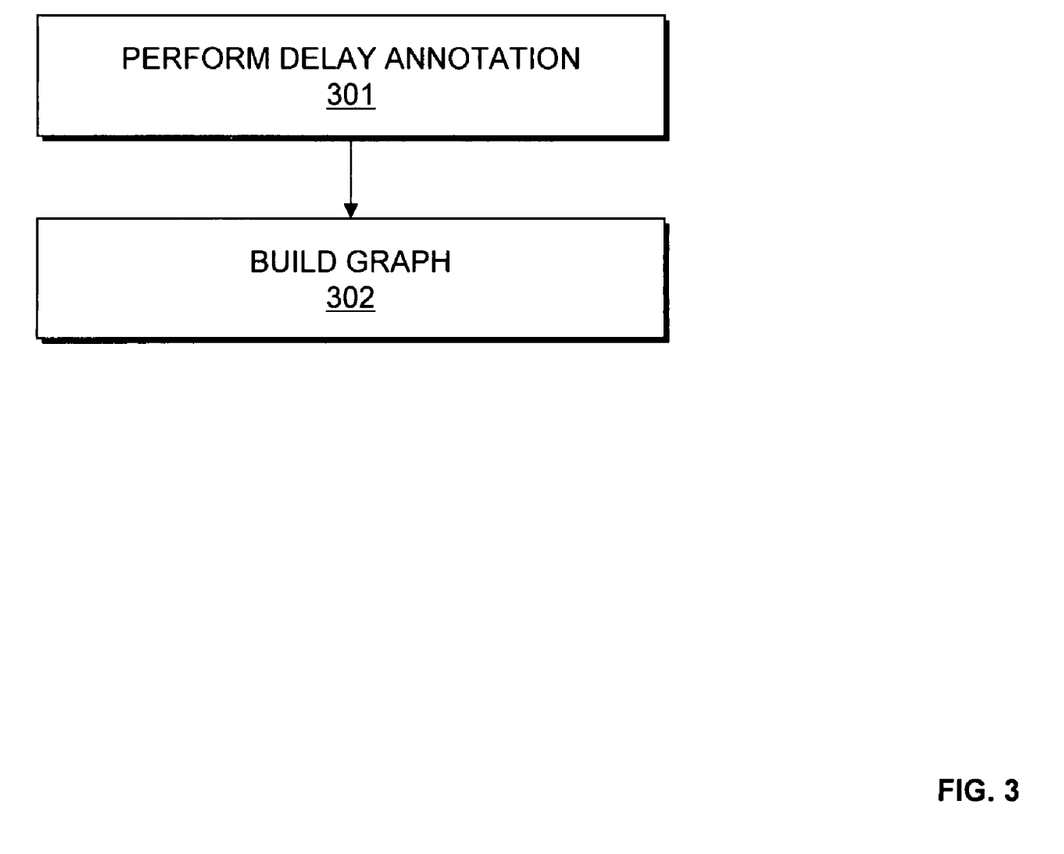
FIG. 3 is a flow chart illustrating a method for performing timing analysis according to an embodiment of the present invention.

FIG. 3 is a flow chart illustrating a method for performing timing analysis according to an embodiment of the present invention. The procedure illustrated in FIG. 3 may be utilized by procedure 104 illustrated in FIG. 1. At 301, delay annotation is performed on the design. According to an embodiment of the present invention delay annotation involves performing routing delay annotation and cell delay annotation for the system. Routing delay annotation involves generating delay values associated with using various wires available on a target device selected for routing a signal on the system. Cell delay annotation involves generating delay values associated with using components on the target device. The components may include logic blocks in LABs, DSP blocks, memory blocks, and other components on the target device. According to an embodiment of the present invention, LUTMASK based delay modeling is used to generate delay values for a signal through a LUT in a logic block.

At 302, graph building is performed. According to an embodiment of the present invention, graph building involves utilizing the delays generated in delay annotation to determine register to register path delays for signals in the system.

Figure 4:
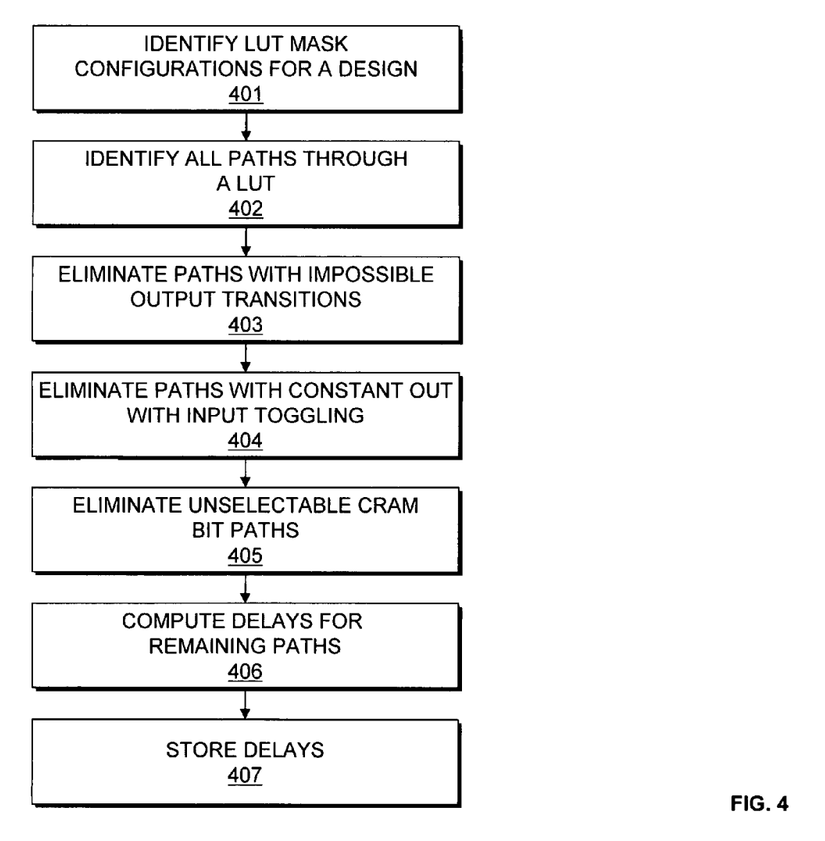
FIG. 4 is a flow chart illustrating a method for performing LUTMASK based modeling according to an embodiment of the present invention.

FIG. 4 is a flow chart illustrating a method for performing LUTMASK based delay modeling according to an embodiment of the present invention. The procedure illustrated in FIG. 4 may be used to implement a portion of procedure 302 illustrated in FIG. 3. At 401, the LUTMASK configurations used for a system design are identified. According to an embodiment of the present invention, only the delays for LUTs that are used for the design (having a CRAM bit configuration that are used) are computed and stored.

At 402, all paths through an identified LUT are identified. According to an embodiment of the present invention, each path may be identified by its data input to its output for a given CRAM bit.

At 403, paths with impossible output transition under a given LUTMASK are eliminated. For a given LUTMASK, each CRAM bit effectuates a rise or fall transition of a LUT. Paths for output transitions that never occur are ignored.

At 404, paths with constant output on a given input transition (input toggling) are eliminated. For a given set of input values, the output of a LUT is driven from a single CRAM bit. According to an embodiment of the present invention, one of the input signals is chosen and the selected input signal is toggled. If the values of both CRAM bits are the same, it is determined that the output of the LUT does not toggle on any of the selected input's transitions. The paths from both CRAM bits to the output of the LUT may be eliminated for any input and output transitions as far as delay of the selected input is concerned.

At 405, paths with unselectable CRAM bit paths are eliminated. Static timing analysis in general does not consider a dynamic setting of input values in its delay modeling. Since most modern FPGAs use LUTs with a fixed number of inputs as its base logic block, some LUTs may have redundant inputs that are tied to Vdd or ground during placement and routing. It may be beneficial to take into account constant inputs in delay modeling. CRAM bits that are not selected by given fixed inputs can be ignored in delay computation. By analyzing constant inputs, unselectable CRAM bit paths may be eliminated.

At 406, delays for the remaining paths through the LUT are computed. According to an embodiment of the present invention, delays for a path may be computed using estimations of delay through each connection and component inside a LUT. The delays may be determined from simulated delay values for given paths.

At 407, the delays are stored. According to an embodiment of the present invention, a minimum and maximum delay value is computed for each remaining path through a LUT. The largest delay value is stored as the maximum delay for a given path and the smallest delay value is stored as the minimum delay for a given path.

The LUTMASK based delay modeling procedure described generates more accurate delay values than traditional LUT delay techniques that utilized a worst delay for all paths through a LUT for a data input. The LUTMASK based delay modeling described also provides an alternative to the computation intensive technique used in the Liberty Model by first eliminating computations associated with LUTMASK configurations that are not used in a system design and then further eliminating computations associated with paths that are not taken in LUTMASK configurations that are used in the system. As a result, the LUTMASK based modeling procedure described transforms the $O(2^n)$ exponential size Liberty Modeling to a $O(n)$ delay computation problem, where n is the number of CRAM bits supported by a LUT.

According to an embodiment of the present invention a hash table may be used to reduce the run time and memory requirement of performing LUTMASK modeling. LUTMASK modeling creates a plurality of different data-set objects which store delay information associated with a LUT in an operation mode. When separate data-set objects are created for all LUTs with unique LUTMASKs in a system, a large number of duplicated objects with the same delay may result. With a four input LUT, a hash table that utilizes 32 delay values as a hash key be used. The 32 delay values is derived from 4 inputs*4 transitions*2 min/max values. The hash table extracts an integer hash value from the 32 different delay values to improve efficiency of hash table access. Since all LUT delays are in a relatively small range, only a few lower bits of delays are distinct and used in the generation of the hash values. Bit-wise operations may be performed on the extracted delay values to create efficient hash values.

Figure 5:
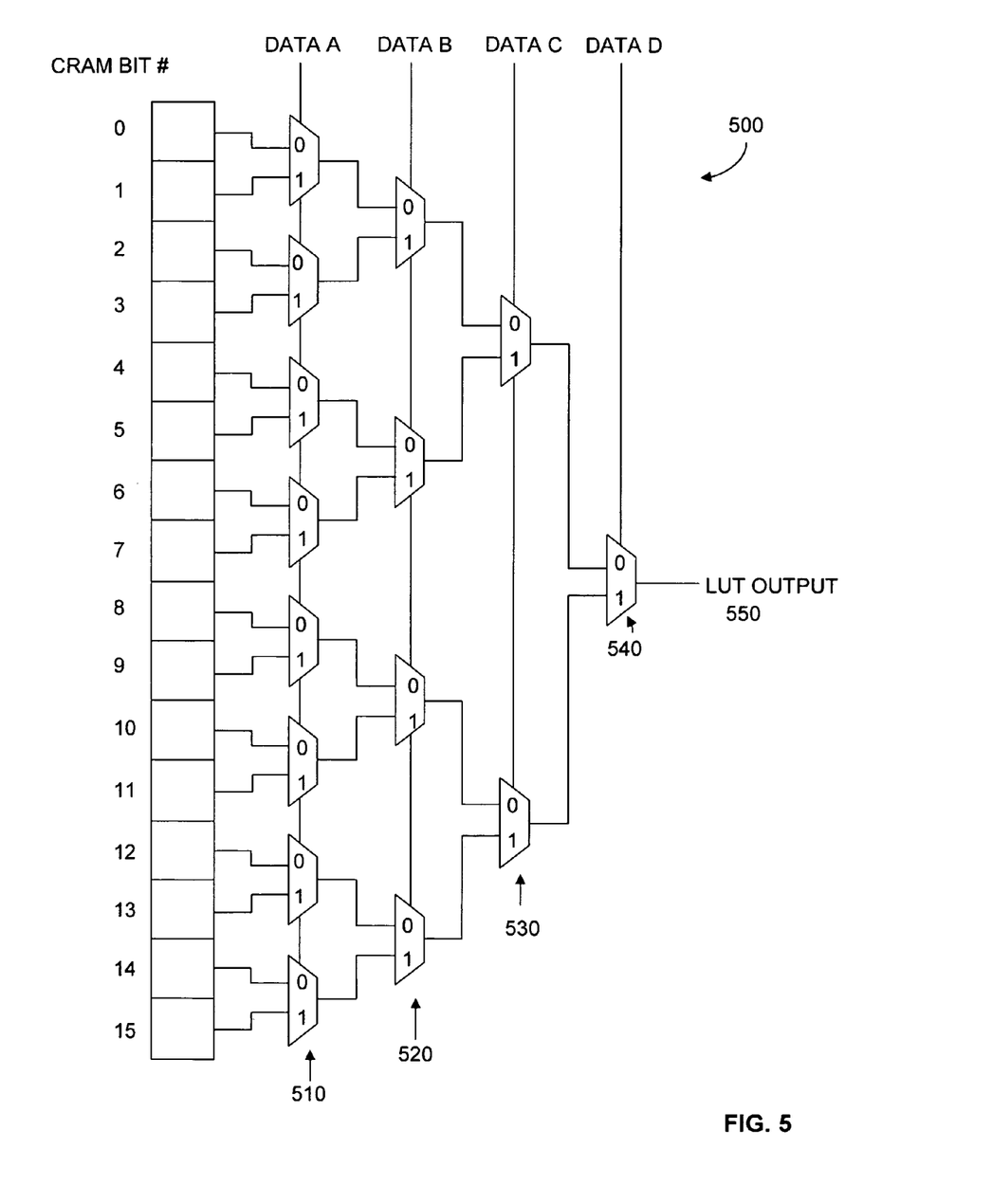
FIG. 5 illustrates a logical representation of a LUT according to an embodiment of the present invention.

FIG. 5 illustrates a logical representation of a four input LUT 500 according to an embodiment of the present invention. The LUT 500 may be implemented in a logic block in a LAB as described with reference to the target device 200 illustrated in FIG. 2. The LUT 500 includes a plurality of CRAM bits (0-15) that may be programmed with either a 0 or 1. By programming the CRAM bits, the LUT 500 may be used to generate a desired logic function. The LUT 500 includes a first stage of multiplexers 510. Each of the multiplexers in the first stage of multiplexers 510 includes inputs from two of the CRAM bits. Each multiplexer selects an output based upon a data input. The multiplexers in the first stage of multiplexers 510 selects an output based upon input data_a (Data A). The LUT 500 includes a second stage of multiplexers 520. Each of the multiplexers in the second stage of multiplexers 520 includes inputs from the output of two of the multiplexers from the first stage of multiplexers 510. The multiplexers in the second stage of multiplexers 520 selects an output based upon input data_b (Data B). The LUT 500 includes a third stage of multiplexers 530. Each of the multiplexers in the third stage of multiplexers 530 includes inputs from the output of two of the multiplexers from the second stage of multiplexers 520. The multiplexers in the third stage of multiplexers 530 selects an output based upon input data_c (Data C). The LUT 500 includes a fourth stage multiplexer 540. The multiplexer in the fourth stage 540 includes inputs from the output of two of the multiplexers from the third stage of multiplexers 530. The multiplexer in the fourth stage 540 selects an output based upon input data_d (Data D). The multiplexer in the fourth stage 540 is connected to LUT output 550.

The logical representation of the LUT 500 is illustrated to include a plurality of stages of multiplexers each receiving a data input to select multiplexers in a stage. It should be appreciated that a physical representation of the LUT 500 may be constructed differently and include additional circuitry to support chain output, sum output, and other outputs.

Figure 6A:
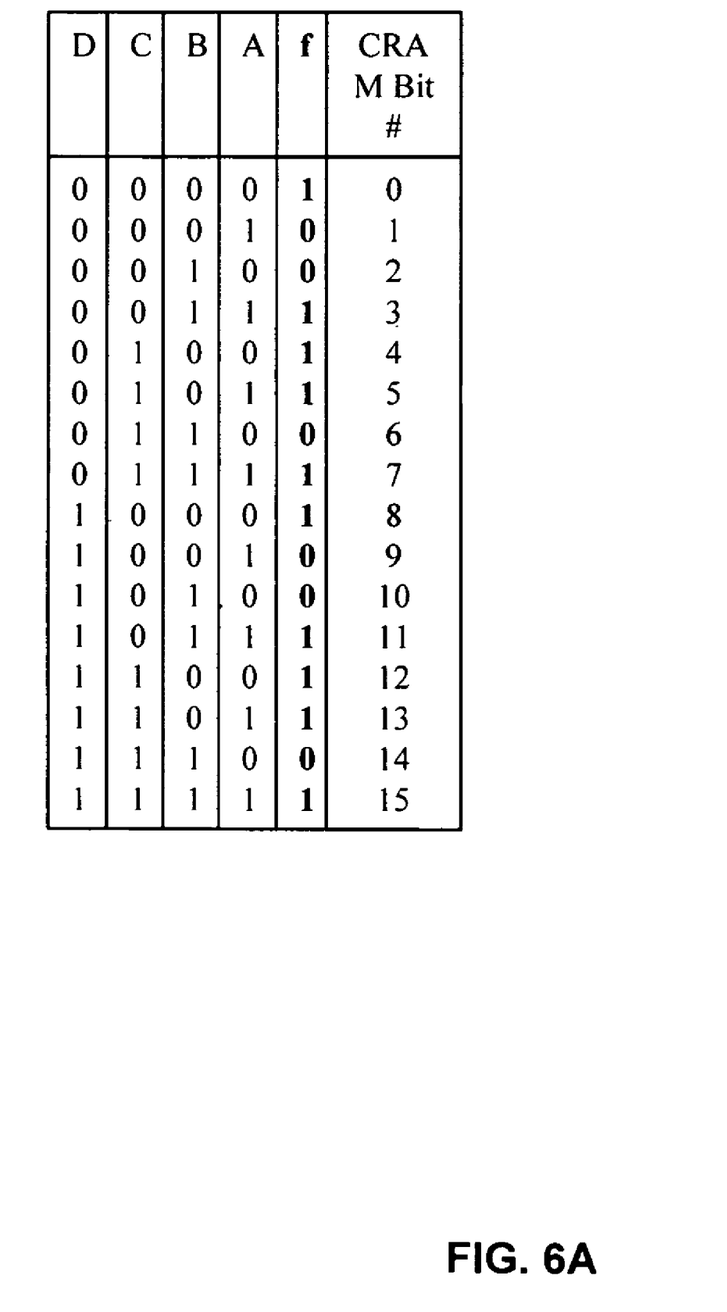
FIGS. 6A and 6B illustrates an example of performing LUTMASK based modeling according to an embodiment of the present invention.
Figure 6B:
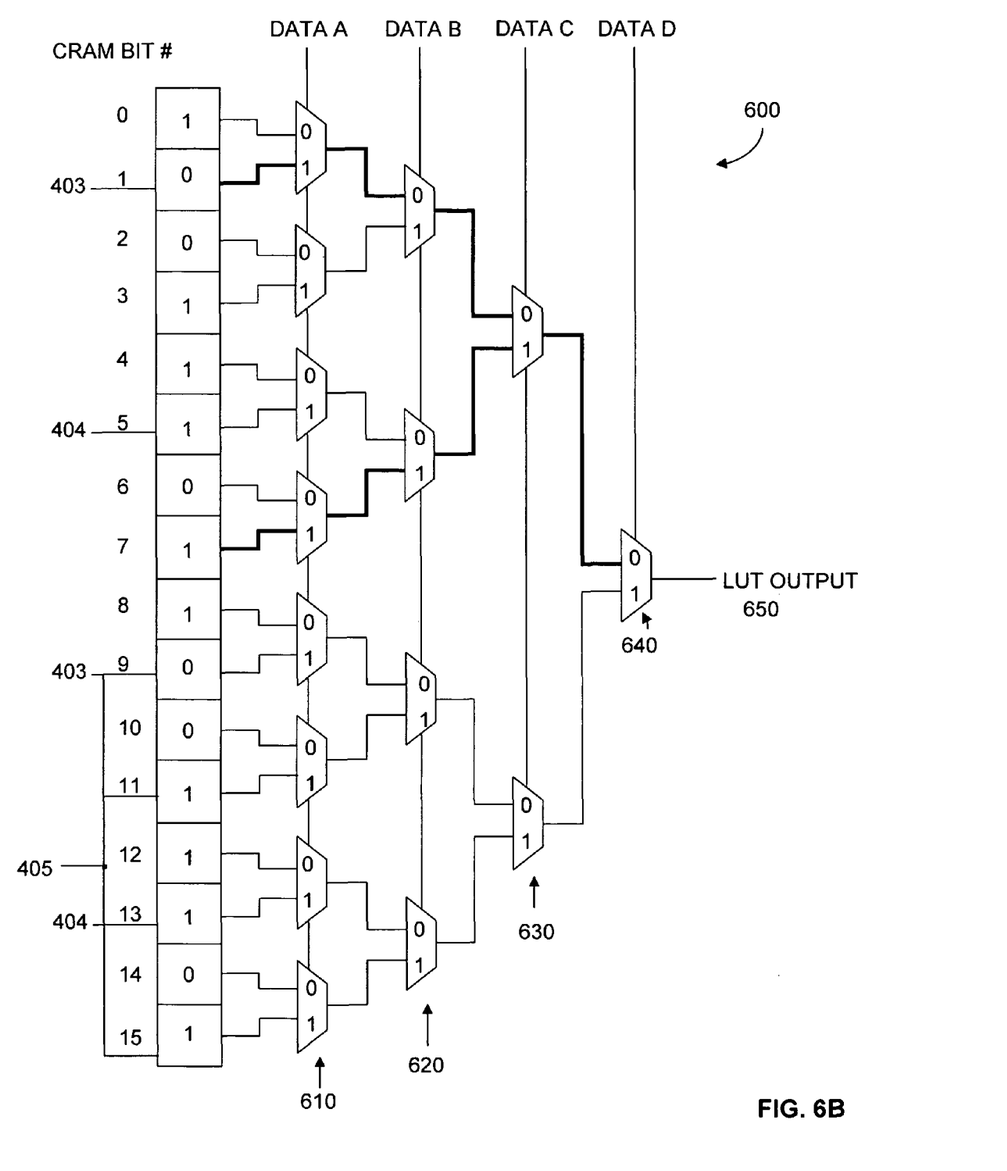

FIGS. 6A and 6B illustrates an example of performing LUTMASK based modeling according to an embodiment of the present invention. FIG. 6A illustrates a truth table for a LUT. The truth table identifies the LUTMASK programming of the CRAM bits 0-15.

FIG. 6B illustrates a LUT 600 implementing the truth table illustrated in FIG. 6A. The LUT 600 includes a plurality of CRAM bits 0-15 which are programmed by a vector of binary number on the truth table in FIG. 6A. LUT 600 is configured similarly to the LUT 500 illustrated in FIG. 5. The LUT 600 includes a plurality of stages of multiplexers 610, 620, 630, and 640, where the output of a multiplexer in an nth stage is input to a multiplexer in an n+1th stage, with the exception of the fourth stage multiplexer which outputs to LUT output 650. Each path may be identified with a data input, output path, and associated CRAM bit. As illustrated in FIG. 6B, each path is drawn to originate from a CRAM bit and traverses through a multiplexer in each of the stages of multiplexers until it reaches the output connection, LUT output 650.

In this example, the maximum LUT delay of rise rise delay of data_a→LUT output is determined, where the input port is data_a, the output port is LUT output 650, the input and output signal transition is rise rise, and the CRAM bit selected is 1001110110011101.

When the delay of data_a is rising, the output at 650 is also rising. Therefore, if data_a is rising, CRAM bits 0, 2, 4, 6, 8, 10, 12, and 14 cannot be activated because the multiplexers in the first stage of multiplexers 610 are selecting the bottom input (labeled 1). Thus, paths through or associated with CRAM bits 0, 2, 4, 6, 8, 10, 12, and 14 can be eliminated leaving paths through CRAM bits 1, 3, 5, 7, 9, 11, 13, and 15.

Impossible output transitions may be analyzed to eliminate further paths in the LUT 600 by applying procedure 403 illustrated in FIG. 4. Since a CRAM bit value of 0 at CRAM bit 1 or CRAM bit 9 cannot cause a rise transition on the output connection 650, the paths through CRAM bit 1 and 9 can be eliminated leaving paths through CRAM bits 3, 5, 7, 11, 13 and 15.

Impossible output transitions with input toggling may be analyzed to eliminate further paths in the LUT 600 by applying procedure 404 illustrated in FIG. 4. For a value of CRAM bit 5 to be propagated to the LUT output 650 on a rise transition of data_a, data_d, data_c, and data_b must be set to 0, 1, 0 and data_a must rise. This indicates that the output of the LUT 600 is changing from the value of CRAM bit 4 to a value of CRAM bit 5. As shown on the truth table in FIG. 6A, values of both CRAM bit 4 and CRAM bit 5 are 1 and a rise transition of data_a does not toggle the output of LUT 600. Thus, the path through CRAM bit 5 can be eliminated. Similarly, for a value of CRAM bit 13 to be propagated to the LUT output 650 on a rise transition of data_a, data_d, data_c, and data_b must be set to 0, 1, 0 and data_a must rise. This indicates that the output of the LUT 600 is changing from the value of CRAM bit 12 to a value of CRAM bit 13. As shown on the truth table in FIG. 6A, values of both CRAM bit 12 and CRAM bit 13 are 1 and a rise transition of data_a does not toggle the output of LUT 600. Thus, the path through CRAM bit 13 can be eliminated. This leaves paths through CRAM bits 3, 7, 11, and 15.

Input dependent false paths may be analyzed to eliminate further paths in the LUT 600. As shown in FIG. 6B, data_d of the input to LUT 600 is set to zero (tied to ground). Since data_d input is set to ground, paths through CRAM bits 9, 11, 13 and 15 may be eliminated since CRAM bits 9, 11, 13, and 15 can never drive the output of LUT 600. According to an embodiment of the present invention, data_d is in a "don't care" state. If it is determined that the delays of paths through CRAM bits 0-7 are shorter (faster) than the delay of paths through, CRAM bits 8-15, data_d can be set to 0 (tied to ground). Since data_d is in a "don't care" state, the input may be selected to be either high or low. This may be performed during synthesis. As a result, the maximum LUT delay for rise rise delay of data_a→LUT output with LUTMASK based delay modeling is a maximum rise rise delay of CRAM bits 3 and 7.

The example described with reference to FIGS. 6A and 6B applies the path elimination procedures 403, 404, and 405 in the order described in FIG. 4. It should be appreciated, however, that path elimination procedures may be performed in a different order and that a subset of the described path elimination procedures may be applied instead. Furthermore, the example described with reference to FIGS. 6A and 6B is applied for determining the delay of a signal through the LUT having a specific input and output ports, input and output transitions, and CRAM bit selection. It should be appreciated that embodiments of the present invention may be utilized for other input and output ports, input and output transitions, and CRAM bit selection. For example, instead of computing a delay of a signal through a LUT output (combout), embodiments of the invention may be applied for computing a delay of a signal through a chain output, sum output, or other output port of a LUT.

Figure 7:
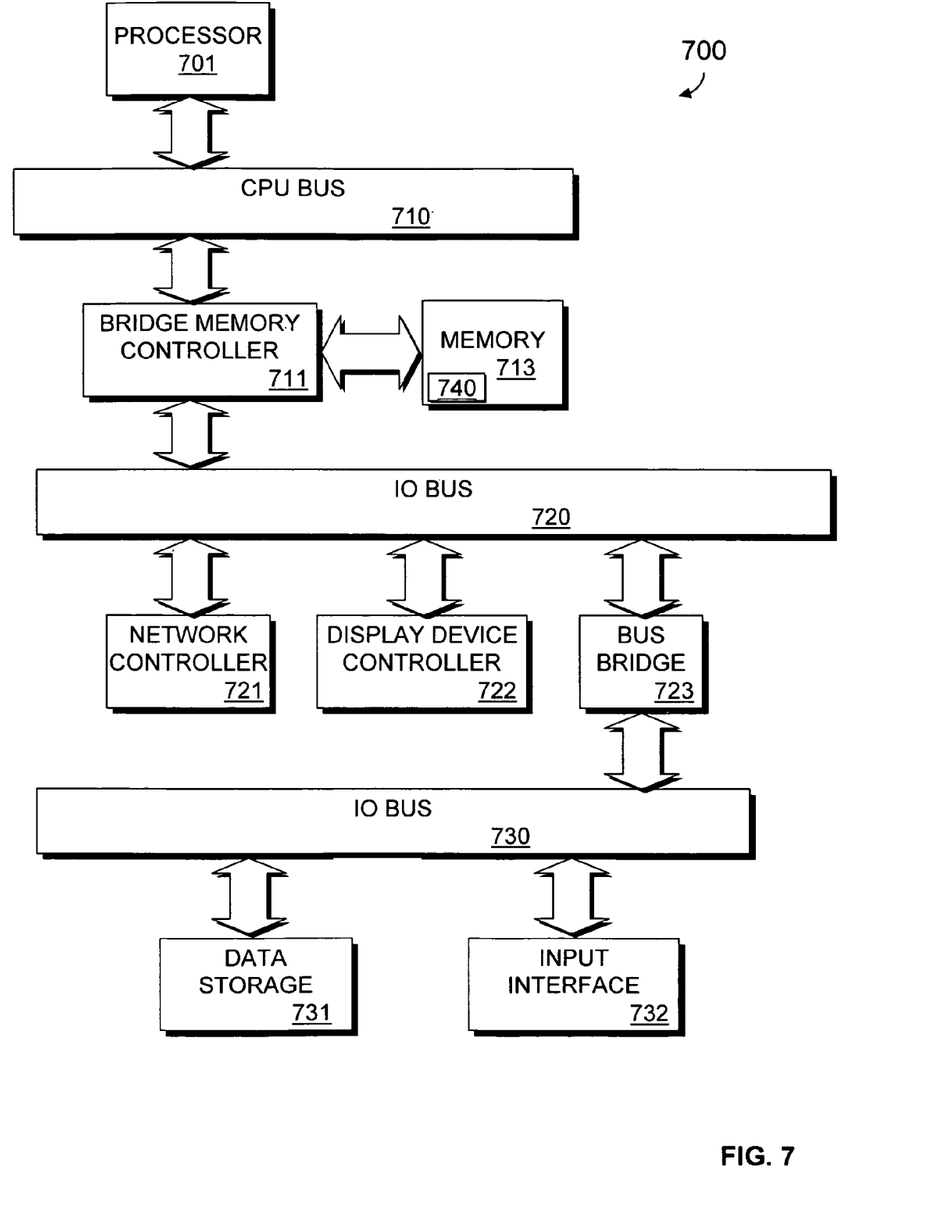
FIG. 7 illustrates a computer system that is used to implement the system designer according to an embodiment of the present invention.

FIG. 7 is a block diagram of an exemplary computer system 700 in which an example embodiment of the present invention resides. The computer system 700 may be used to implement the system designer 900 shown in FIG. 9. The computer system 700 includes a processor 701 that processes data signals. The processor 701 is coupled to a CPU bus 710 that transmits data signals between processor 701 and other components in the computer system 700.

The computer system 700 includes a memory 713. The memory 713 may store instructions and code represented by data signals that may be executed by the processor 701.

A bridge memory controller 711 is coupled to the CPU bus 710 and the memory 713. The bridge memory controller 711 directs data signals between the processor 701, the memory 713, and other components in the computer system 700 and bridges the data signals between the CPU bus 710, the memory 713, and a first IO bus 720.

The first IO bus 720 may be a single bus or a combination of multiple buses. The first IO bus 720 provides communication links between components in the computer system 700. A network controller 721 is coupled to the first IO bus 720. The network controller 721 may link the computer system 700 to a network of computers (not shown) and supports communication among the machines. A display device controller 722 is coupled to the first IO bus 720. The display device controller 722 allows coupling of a display device (not shown) to the computer system 700 and acts as an interface between the display device and the computer system 700.

A second IO bus 730 may be a single bus or a combination of multiple buses. The second IO bus 730 provides communication links between components in the computer system 700. A data storage device 731 is coupled to the second IO bus 730. The data storage device 731 may be a hard disk drive, a floppy disk drive, a CD-ROM device, a flash memory device or other mass storage device. An input interface 732 is coupled to the second IO bus 730. The input interface 732 may be, for example, a keyboard and/or mouse controller or other input interface. The input interface 732 may be a dedicated device or can reside in another device such as a bus controller or other controller. The input interface 732 allows coupling of an input device to the computer system 700 and transmits data signals from an input device to the computer system 700. A bus bridge 723 couples the first IO bus 720 to the second IO bus 730. The bus bridge 723 operates to buffer and bridge data signals between the first IO bus 720 and the second IO bus 730. It should be appreciated that computer systems having a different architecture may also be used to implement the computer system 700.

A system designer 740, may reside in memory 713 and be executed by processor 701. The system designer 740 may operate to synthesize a system, place the system on a target device, route the system, and perform timing analysis on a design for the system using LUTMASK based delay modeling.

Figure 8:
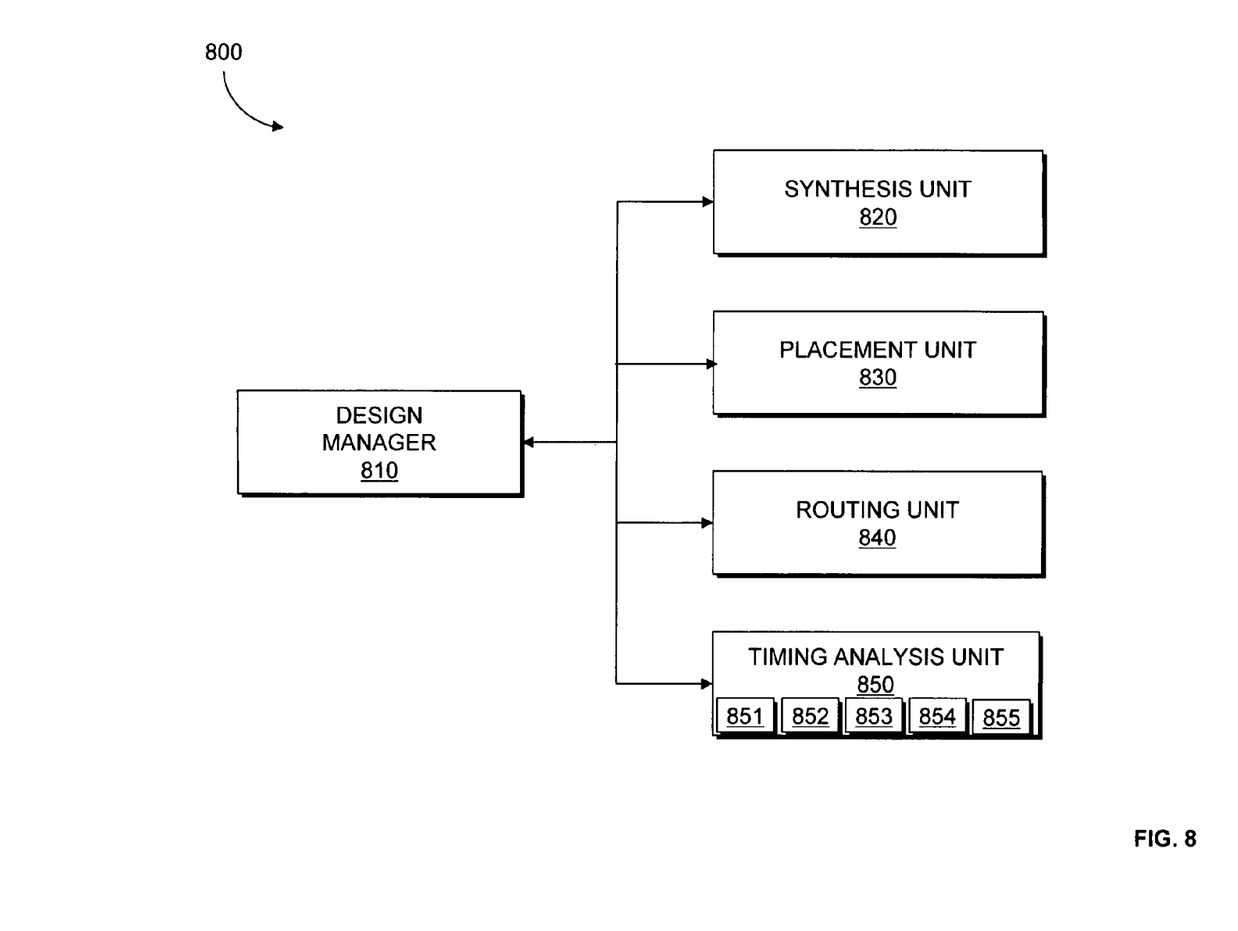
FIG. 8 illustrates a system designer according to an embodiment of the present invention.

FIG. 8 illustrates a system designer 800 according to an embodiment of the present invention. The system designer 800 may be an EDA tool for designing a system on a target device. The target device may be, for example, an ASIC, a structured ASIC, an FPGA, a PLD, or other circuitry. Furthermore the logic design may be implemented using semiconductor or nanoelectronic technology. FIG. 8 illustrates software modules implementing an embodiment of the present invention. According to one embodiment, system design may be performed by a computer system executing sequences of instructions represented by the software modules shown in FIG. 8. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 800 includes a designer manager 810. The designer manager 810 receives a design for a system. The design may be described at a gate level or in a more abstract level. The design may be described in terms of an HDL such as VHDL or Verilog. The target device may be an ASIC, structured ASIC, FPGA, PLD, or other target device. The designer manager 810 is connected to and transmits data between the components of the system designer 800.

Block 820 represents a synthesis unit that performs synthesis. The synthesis unit 820 generates a logic design of a system to be implemented in the target device. According to an embodiment of the system designer 800, the synthesis unit 820 takes a conceptual HDL design definition and generates an optimized logical representation of the system. The optimized logical representation of the system generated by the synthesis unit 820 may include a representation that has a minimized number of functional blocks and registers, such as logic gates and logic elements, required for the system. Alternatively, the optimized logical representation of the system generated by the synthesis unit 820 may include a representation that has a reduced depth of logic and that generates a lower signal propagation delay. The synthesis unit 820 also performs technology mapping. Technology mapping involves determining how to implement the functional blocks and registers in the optimized logic representation utilizing specific resources on a target device thus creating an optimized "technology-mapped" netlist. The technology-mapped netlist illustrates how the resources (components) on the target device are utilized to implement the system.

Block 830 represents a placement unit that performs placement. The placement unit 830 places the system on to the target device by determining which components or areas on the target device are to be used for specific functional blocks and registers. According to an embodiment of the system designer 800, the placement unit 830 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The placement unit 830 may utilize a cost function in order to determine a good assignment of resources on the target device.

Block 840 represents a routing unit that performs routing. The routing unit 840 determines the routing resources on the target device to use to provide interconnection between the components implementing functional blocks and registers of the logic design.

Block 850 represents a timing analysis unit. The timing analysis unit 850 may perform timing analysis to determine one or more delay values for one or more paths in the system. The timing analysis unit 850 may perform delay annotation to determine the delays associated with routing and components in a design and graph building to determine register to register delay. The timing analysis unit 850 may utilize LUTMASK based delay modeling in its delay annotation of delays through a LUT.

The timing analysis unit 850 includes a LUTMASK identifier unit 851 that identifies LUTMASK configurations used for a system design are identified. According to an embodiment of the present invention, only the delays for LUTs that are used for the design (having a CRAM bit configuration that are used) are computed and stored. The timing analysis unit 850 includes a path identifier unit 852 that identifies all paths through an identified LUT in the design. According to an embodiment of the present invention, each path may be identified by its data input to its output for a given CRAM bit. The timing analysis unit 850 includes an output transition identifier unit 853 that identifies impossible output transition under a given LUTMASK for elimination. The timing analysis unit 850 includes an input transition identifier unit 854 that identifies paths with constant output on a given input transition (input toggling) for elimination. The timing analysis unit 850 includes an unselectable CRAM bit path identifier unit 855 to identify paths with unselectable CRAM bit paths for elimination.

The one or more delay values generated by the timing analysis unit 850 may be output to a designer or user of the system. Alternatively, timing analysis may be performed during or after synthesis, placement, and/or routing and the one or more delay values may be used to improve or optimize synthesis, placement, and/or routing decisions made by the synthesis unit 820, placement unit 830, and routing unit 840 respectively.

According to an embodiment of the system designer 800, the design manager 810 performs an assembly procedure that creates a data file that includes the design of the system generated by the system designer 800. The data file may be a bit stream that may be used to program the target device. The design manager 810 may output the data file so that the data file may be stored or alternatively transmitted to a separate machine used to program the target device. It should be appreciated that the design manager 810 may also output the design of the system in other forms such as on a display device or other medium.

FIGS. 1, 3 and 4 are flow charts illustrating methods according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for determining a delay for a signal through a lookup table (LUT) on a programmable circuit, the method comprising:
    identifying one or more configurable random access memory (CRAM) bit paths through the LUT by eliminating one of a false CRAM bit path, a CRAM bit path with an impossible output transition under a given LUTMASK, a CRAM bit path with a constant output on input toggling, and an unselectable CRAM bit path associated with a constant input, wherein the one or more CRAM bit paths are associated with transitions that affect an output of the LUT; and
    computing a delay for the signal based on the one or more CRAM bit paths identified without computing delays associated with other CRAM bit paths through the LUT, wherein one of the identifying and the computing is implemented using a computer.

2. The method of claim 1, wherein each CRAM bit path of the CRAM bit paths through the LUT is associated with a data input, an output port, and a CRAM bit and travels through a plurality of programmable multiplexers.

3. The method of claim 1, wherein the delay corresponds to an input and output port, input and output signal transition, and CRAM bits selected.

4. The method of claim 1, further comprising selecting redundant inputs that improve fitting of the LUT on the programmable circuit.

5. The method of claim 4, wherein the redundant inputs reduce delay.

6. The method of claim 4, wherein the redundant inputs reduce power consumption.

7. The method of claim 1, further comprising storing the delays computed with a hash.

8. A non-transitory computer-readable medium including sequences of instructions, the sequences of instructions including instructions which when executed by a computer cause the computer to perform a method comprising:
    identifying one or more configurable random access memory (CRAM) bit paths through a lookup table (LUT) by eliminating one of a false CRAM bit path, a CRAM bit path with an impossible output transition under a given LUTMASK, a CRAM bit path with a constant output on input toggling, and an unselectable CRAM bit path associated with a constant input, wherein the one or more CRAM bit paths are associated with transitions that affect an output of the LUT; and
    computing a delay for a signal in response to the one or more CRAM bit paths identified without computing delays associated with other CRAM bit paths through the LUT.

9. The non-transitory computer-readable medium of claim 8, wherein the delay is specific to an input and output port, input and output signal transition, and CRAM bits selected.

10. The non-transitory computer-readable medium of claim 8, wherein the method further comprises selecting redundant inputs that improve fitting the LUT on a programmable circuit.

11. The non-transitory computer-readable medium of claim 10, wherein the redundant inputs reduce delay.

12. The non-transitory computer-readable medium of claim 10, wherein the redundant inputs reduce power consumption.

13. The non-transitory computer-readable medium of claim 8, wherein each CRAM bit path of the CRAM bit paths through the LUT is associated with a data input, an output port, and a CRAM bit and travels through a plurality of programmable multiplexers.

14. The non-transitory computer-readable medium of claim 8, wherein the method further comprises storing the delays computed with a hash.

15. A design system, comprising:
    a synthesis unit operable to synthesize a system;
    a placement unit operable to place the system on a target device;
    a routing unit operable to route the system on the target device; and
    a timing analyzer unit operable to identify one or more configurable random access memory (CRAM) bit paths through a LUT by eliminating one of a CRAM bit path with an impossible output transition under a given LUTMASK, a CRAM bit path with a constant output on a given input transition, and an unselectable CRAM bit path, and operable to compute a delay of a signal in response to the one or more CRAM bit paths identified without computing delays associated with other CRAM bit paths through the LUT, wherein the one or more CRAM bit paths identified are associated with transitions that affect an output of the LUT.

16. The design system of claim 15, wherein each CRAM bit path of the CRAM bit paths through the LUT is associated with a data input, an output port, and a CRAM bit and travels through a plurality of programmable multiplexers.

17. The design system of claim 15, wherein the delay corresponds to an input and output port, input and output signal transition, and CRAM bits selected.

18. The design system of claim 15, wherein the timing analyzer unit is operable to select redundant inputs that improve fitting of the LUT on the programmable circuit.

19. The design system of claim 18, wherein the redundant inputs reduce delay.

20. The design system of claim 18, wherein the redundant inputs reduce power consumption.

21. The design system of claim 15 further comprising a hash table operable to store the delays computed with a hash.

* * * * *